April 17, 1945.  J. G. SLAVENS  2,373,980
GUY LINE SHACKLE
Filed Sept. 22, 1943

INVENTOR.
J. G. SLAVENS
BY B. Birkenbeuel
ATTORNEY

Patented Apr. 17, 1945

2,373,980

UNITED STATES PATENT OFFICE 2,373,980

GUY LINE SHACKLE

James G. Slavens, Cornelius, Oreg.

Application September 22, 1943, Serial No. 503,453

4 Claims. (Cl. 294—74)

This invention relates generally to wire rope and particularly to a guy line shackle.

The main object of this invention is to construct an exceedingly simple form of guy line shackle which will simplify the operation of fastening a guy line to a stump or tree and which will securely hold the line in place as long as is desired.

The second object is to construct a guy line shackle in a manner that when once fastened in place, there is no opportunity for it to become released.

The third object is to construct a guy line clamp which will be light in weight and easy to apply by a high climber who must attach a line to a tree far above the ground.

I accomplish these and other objects in the manner set forth in the following specification as illustrated in the accompanying drawing in which.

Similar numbers of reference refer to the same or similar parts throughout the several views.

Figure 1:
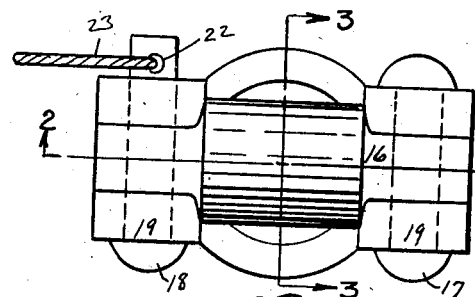
Fig. 1 is a plan of the shackle.
Figure 2:
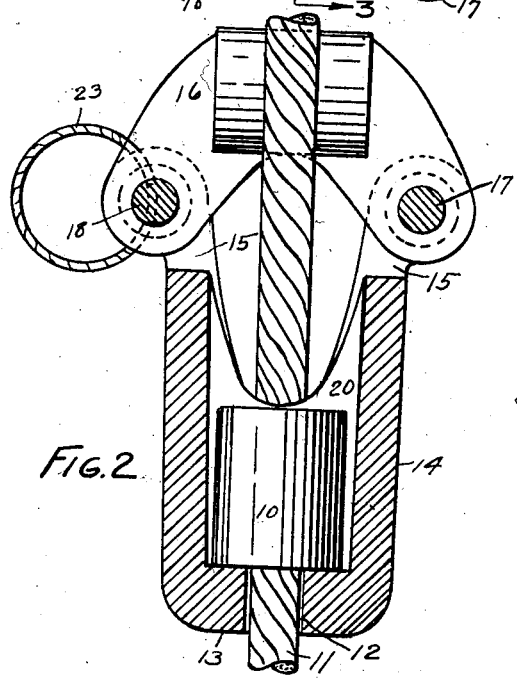
Fig. 2 is an elongated section taken along the line 2—2 in Fig. 1.
Figure 3:
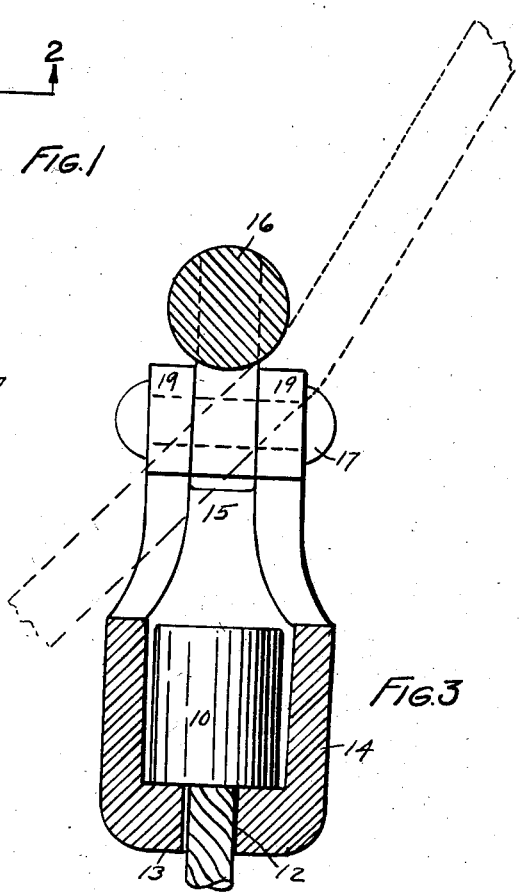
Fig. 3 is an elongated section taken along the line 3—3 in Fig. 1.
Figure 4:
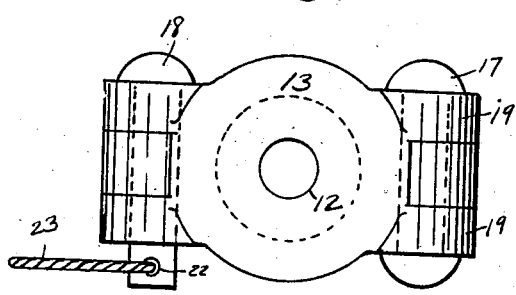
Fig. 4 is an end view of the shackle.
Figure 5:
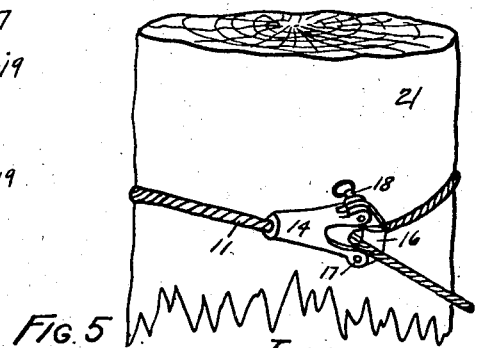
Fig. 5 shows the shackle attached to a spar tree.

Referring in detail to the drawing, there is shown a ferrule 10 which is secured on the end of a guy line 11. The line 11 is threaded through an opening 12 in the end 13 of the somewhat tapering cylindrical member 14 which extends upwardly to the forked arms 15 between which is placed a gate 16 which effectively closes the opening of the member 14 when the rivets 17 and pin 18 are placed in position, namely, extending through the arm ends 19 of the member 14 and through the ends of the gate 16. It will be noted that the member 14 is somewhat elongated, the purpose being to remove as much as possible of the bending action. The gate 16 is so shaped in cross section as to be sufficiently strong for the purpose and also to be as easy as possible on the line 11.

It will be noted that the rivet 17 and pin 18 are between the middle of the gate 16 and the cut away portion of the member 14, in which is formed the cylindrical recess 20.

The rivet 18 is provided with a hole 22 through which is placed a grommet which is easily put into place by the high climber and once in place will never drop out accidently but must be unwound or cut.

In the operation of the device the climber takes the shackle up on the tree 21 with the line 11 added to the shackle and when he reaches the fastening point he passes the shackle around the tree having the pin 18 withdrawn and the gate 16 open. He then brings the bight of the line 11 between the members 15 and clamps the gate 16 behind it. He then inserts the pin 18 and then places the grommet 23 in the hole 22 thereby permanently securing the shackle in place until the grommet 23 is cut or undone.

While I have thus illustrated and described my invention it is not my intention to be limited to the precise form shown herein, but I do intend to cover such forms and modifications thereof as fall fairly within the appended claims.

I claim:

1. In a device of the class described, a tubular body having a reduced opening at one end and having forked arms projecting from the other end thereof and a gate adapted to have the ends thereof fastened between said forked arms, said tubular body being cut away from the side thereof to permit the bight of a line to pass beyond said gate.

2. A guy line shackle consisting of a tubular member having a restricted opening at one end for the reception of a guy line ferrule, said tubular member having a hinged gate across the opposite end thereof, the sides of said tubular member being cut away at its unrestricted end at opposite sides thereof and a pin for locking said gate in a closed position in a manner to confine the bight of line within the shackle, said hinge and pin being disposed between the middle of said gate and the cut away portion of the tubular member.

3. In a shackle of the class described, a combination of a tubular member, one end of which has a restricted opening and the other end of which terminates in a pair of forked arms, a gate extending across said forked arms characterized by having its intermediate portion cylindrical in cross section, the axis of which is normal to the axis of said tubular member, a pin and rivet extending through the gate ends and through their respective arms for the purpose of closing the opening between said arms and a grommet passing through the end of said pin to prevent the removal thereof.

4. A shackle of the class described consisting of an elongated tubular body having a somewhat tapering unbroken recess formed therein, the small end of said recess having a restricted opening adapted to form a shoulder for engagement with a cable ferrule through which opening the cable itself can pass while the ferrule is confined within the tapered recess, the opposite end of said tubular body having the opposite sides thereof terminating in a pair of forked projections and an arcuate gate of flat stock curving away from said tubular body, one end of said gate being hinged between one pair of forks and the other end of said gate being removably attached between the other pair of forks, said gate being characterized by having the middle portion thereof enlarged to form a cylinder, the axis of which is normal to the axis of said tubular body, said gate being adapted to withstand lateral bending strains.

JAMES G. SLAVENS.